US006779184B1

(12) United States Patent
Puri et al.

(10) Patent No.: US 6,779,184 B1
(45) Date of Patent: Aug. 17, 2004

(54) METHOD FOR LOOSELY COUPLING OBJECT ORIENTED AND NON-OBJECT ORIENTED APPLICATIONS IN A MESSAGING-BASED COMMUNICATION INFRASTRUCTURE

(75) Inventors: Arvind Nath Puri, Pleasanton, CA (US); Matthew Hom, Irvine, CA (US); Ashok Subramanian, Fremont, CA (US); Sundera Rajan, Redwood City, CA (US); Palnisamy Murali Senthil Kumar, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/235,119

(22) Filed: Jan. 21, 1999

(51) Int. Cl.[7] .............................. G06F 9/44; G06F 9/46; G06F 15/173
(52) U.S. Cl. ........................ 719/315; 719/328; 709/238
(58) Field of Search ................................ 709/315, 328, 709/316; 719/328, 310, 200, 202, 204, 231, 238, 246

(56) References Cited

U.S. PATENT DOCUMENTS

| | | | | |
|---|---|---|---|---|
| 5,327,559 A | * | 7/1994 | Priven et al. ................ 709/101 |
| 5,379,432 A | * | 1/1995 | Orton et al. .................. 703/21 |
| 5,398,336 A | * | 3/1995 | Tantry et al. .................... 700/9 |
| 5,404,529 A | * | 4/1995 | Chernikoff et al. ........... 703/27 |
| 5,432,925 A | * | 7/1995 | Abraham et al. ........... 709/316 |
| 5,497,491 A | * | 3/1996 | Mitchell et al. ............. 709/315 |
| 5,606,700 A | * | 2/1997 | Anthias et al. .............. 719/315 |
| 5,838,918 A | * | 11/1998 | Prager et al. ................ 709/221 |
| 5,903,755 A | * | 5/1999 | Matheson et al. ........... 709/315 |
| 5,913,061 A | * | 6/1999 | Gupta et al. ................. 709/310 |
| 5,956,506 A | * | 9/1999 | Cobb et al. .................. 709/101 |
| 5,960,214 A | * | 9/1999 | Sharpe et al. ................... 700/9 |
| 5,966,531 A | * | 10/1999 | Skeen et al. ................. 709/315 |
| 6,021,443 A | * | 2/2000 | Bracho et al. ............... 709/241 |
| 6,067,477 A | * | 5/2000 | Wewalaarachchi et al. ... 700/83 |
| 6,094,688 A | * | 7/2000 | Mellen-Garnett et al. ... 709/328 |
| 6,163,776 A | * | 12/2000 | Periwal .......................... 707/4 |
| 6,182,154 B1 | * | 1/2001 | Campagnoni et al. ....... 709/315 |
| 6,256,676 B1 | * | 7/2001 | Taylor et al. ................ 709/246 |
| 6,260,077 B1 | * | 7/2001 | Rangarajan et al. ......... 709/107 |
| 6,317,773 B1 | * | 11/2001 | Cobb et al. .................. 709/101 |
| 6,347,342 B1 | * | 2/2002 | Marcos et al. ............... 709/310 |
| 6,360,229 B2 | * | 3/2002 | Blackman et al. ....... 707/103 R |
| 6,405,266 B1 | * | 6/2002 | Bass et al. ................... 709/328 |
| 6,414,695 B1 | * | 7/2002 | Schwerdtfeger et al. .... 345/705 |

OTHER PUBLICATIONS

Coulouris, George et al. "Distributed Systems Concepts and Design". Addison–Wesley Publishers, 1994. Chapter 15, pp. 449–471.*

Sutherland, Jeff et al., "The Hybrid Object–Relational Architecture (HORA): An Integration of Object–oriented and Relational Technology". ACM. 1993.*

* cited by examiner

Primary Examiner—Lewis A. Bullock, Jr.
(74) Attorney, Agent, or Firm—Young Law Firm, P.C.

(57) ABSTRACT

Methods and network architectures for loosely coupling object and non-object oriented applications to a network include an object broker hub, a messaging system, and a business object representation of data. Business objects are embodied by a combination of high level APIs, low level APIs and data stores in each of the applications. The messaging system implements a publish-subscribe model in which all messages conform to a logical definition common to all applications. The higher level APIs, based upon the content of the message, commit the necessary low level APIs access the application's data stores to execute the business object. The loosely coupled nature of the messaging system, coupled with the dual API and switch concepts, allows a loose coupling of object and non-object oriented applications and enhances the functionality of non-object applications by allowing them to execute functionally complete business objects.

10 Claims, 3 Drawing Sheets

METHOD FOR LOOSELY COUPLING OBJECT ORIENTED AND NON-OBJECT ORIENTED APPLICATIONS IN A MESSAGING-BASED COMMUNICATION INFRASTRUCTURE

BACKGROUND OF THE INVENTION

1. Field of the Invention

The present invention relates to computer implemented methods and network architectures for loosely coupling dissimilar applications, such as relational and object-oriented applications in an object broker-based messaging system.

2. Description of the Related Art

Applications may be coupled to a database system and to other applications in a network. Such coupling may take the form of a point-to-point connection of each application to each other application with which it must communicate. However, such a point-to-point integration requires that each application package its communications into a form acceptable to the intended recipient. This, in turn, requires that each application store the communication requirements of each other application with which it may need to exchange information. Adding a new application to the network then becomes a time consuming and complicated undertaking, as the new application must be modified to enable it to communicate with each of the other applications on the network. Moreover, all existing applications must also be modified to enable them to communicate with the newly added application.

To attempt to overcome some of these disadvantages, object broker-based standards have evolved, such as the Common Object Request Broker (CORBA) standard. In networks implementing such a standard, an object broker acts as a central hub and manages communications between the different application systems coupled thereto.

However, even when the hub and spoke network architecture inherent in CORBA is implemented, applications of different types may not be able to communicate with one another or may not be able to communicate with one another to full advantage. For example, integration of object-oriented and relational applications has generally not been attempted, as relational applications, by their very nature, lack the ability to encapsulate the necessary functionality into their communications to take full advantage of the capabilities of object-oriented applications.

What is needed, therefore, are methods and network architectures that allow disparate types of applications to be added to the network with ease, in a manner that allows full communication between all applications coupled to the network. What are also needed are methods and network architectures that avoid the aforementioned disadvantages of point-to-point integration of applications. Moreover, what are also needed are methods of coupling dissimilar applications, such as relational and object-oriented applications, to a common network. Such methods and network architectures should, moreover, make advantageous use of any existing resources within the applications without, however, becoming overly dependent upon the characteristics of any one application coupled to the network.

SUMMARY OF THE INVENTION

It is, therefore, an object of the present invention to provide methods and network architectures that allow disparate types of applications to be added to the network with ease, in a manner that allows full communication between all applications coupled to the network. A further object of the present invention is to provide methods and network architectures that avoid the aforementioned disadvantages of point-to-point integration of applications. A still further object of the present invention is to provide methods of coupling dissimilar application systems, such as relational and object-oriented systems, to a common network. In accordance with the above-described objects and those that will be mentioned and will become apparent below, a method of loosely coupling object and non-object oriented applications in a network, according to an embodiment of the present invention, comprises the steps of switching an incoming message toward at least one selected application coupled to the network; and routing, for each selected application, the incoming message to a selected business object according to predetermined rules associated with a type of the incoming message. The business object includes a high level application program interface (API), business logic and at least one low level API, the high level API performing a business function of the business object by invoking at least one selected low level API within the selected application.

The present invention may also be viewed as a loosely coupled network of applications, comprising an object broker, the object broker receiving and distributing messages over the network; at least one switching means coupled to the object broker, the switching means storing a plurality of rules adapted to respond to business information embedded within the distributed messages and to switch the distributed messages toward selected applications; and a high level application program interface (API) disposed between each switching means and each application coupled to the network, each high level API being configured to transform the switched messages to a format appropriate to the selected applications.

BRIEF DESCRIPTION OF THE DRAWINGS

For a further understanding of the objects and advantages of the present invention reference should be made to the following detailed description, taken in conjunction with the accompanying figures, in which.

DESCRIPTION OF THE PREFERRED EMBODIMENTS

Hardware Overview

Figure 3:
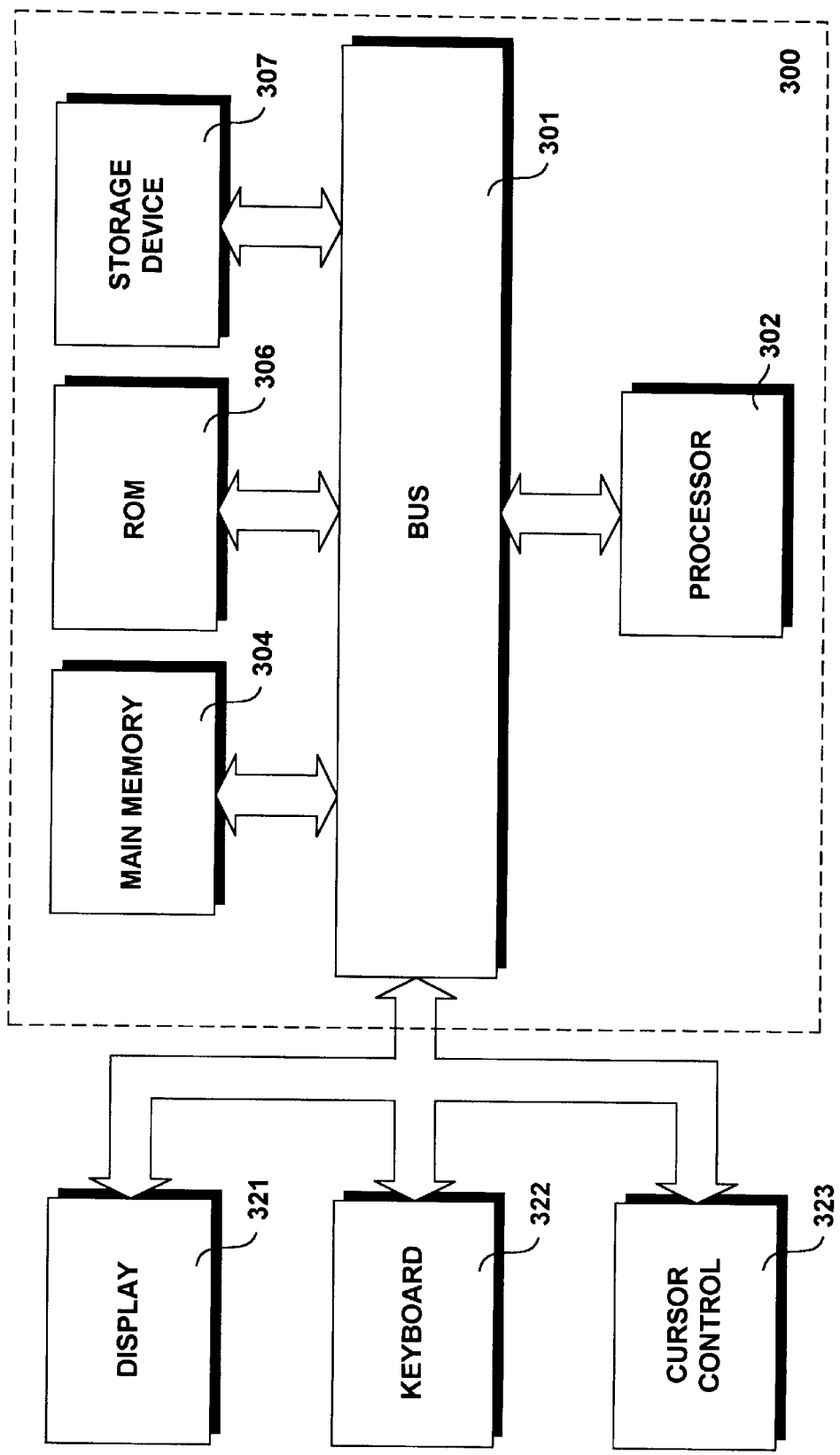
FIG. 3 illustrates a block diagram of a computer system within which an embodiment of the present invention may be implemented.

FIG. 3 illustrates a block diagram of a computer system 300 upon which an embodiment of the present invention may be implemented. Computer system 300 includes a bus 301 or other communication mechanism for communicating information, and one or more processors 402 (one shown in FIG. 3) coupled with bus 301 for processing information. Computer system 300 further comprises a random access memory (RAM) or other dynamic storage device 304 (referred to as main memory), coupled to bus 301 for storing information and instructions to be executed by processor(s) 302. Main memory 304 also may be used for storing temporary variables or other intermediate information during execution of instructions by processor 302. Computer system 300 also includes a read only memory (ROM) and/or other static storage device 306 coupled to bus 301 for storing static information and instructions for processor 302. A data storage device 307, such as a magnetic disk or optical disk, is coupled to bus 301 for storing information and instructions.

The computer system 300 may also be coupled via the bus 301 to a display device 321, such as a cathode ray tube (CRT), for displaying information to a computer user. An alphanumeric input device 322, including alphanumeric and other keys, is typically coupled to bus 301 for communicating information and command selections to processor(s) 302. Another type of user input device is cursor control 323, such as a mouse, a trackball, or cursor direction keys for communicating direction information and command selections to processor 302 and for controlling cursor movement on display 321. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 322 wherein all interface is provided via the stylus as a writing instrument (like a pen) and the written text is interpreted using optical character recognition (OCR) techniques.

The present invention is related to the use of computer system 300 and/or to a plurality of such computer systems to loosely couple object-oriented and non-object oriented applications in a messaging-based communications infrastructure. According to one embodiment, the loose coupling is provided by one or more computer systems 300 in response to processor(s) 302 executing sequences of instructions contained in memory 304. Such instructions may be read into memory 304 from another computer-readable medium, such as data storage device 307. Execution of the sequences of instructions contained in memory 304 causes processor(s) 302 to perform the process steps that will be described hereafter. In alternative embodiments, hard-wired circuitry may be used in place of or in combination with software instructions to implement the present invention. Thus, the present invention is not limited to any specific combination of hardware circuitry and software.

Functional Overview

Figure 1:
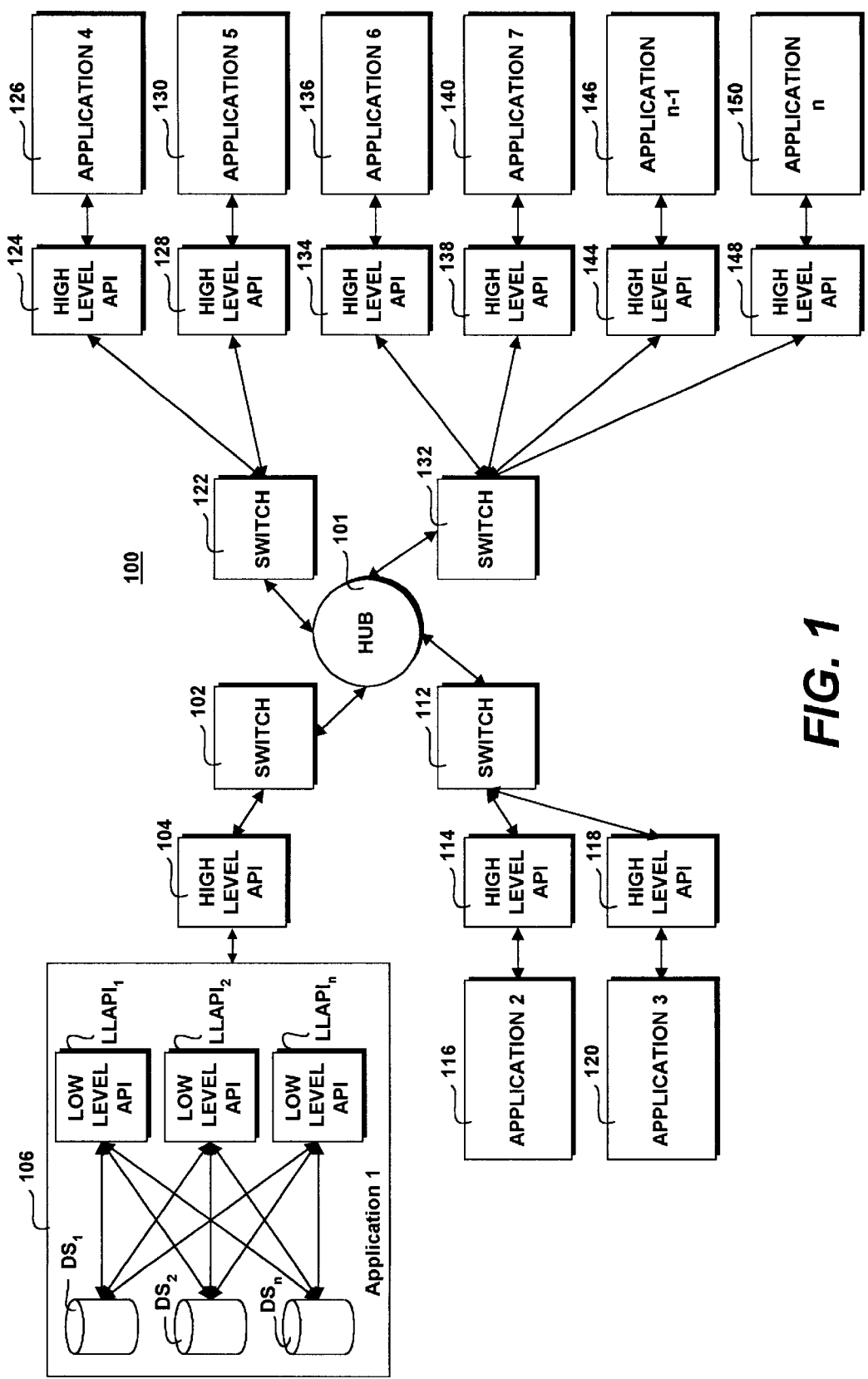
FIG. 1 shows an embodiment of an architecture for loosely coupling object-oriented and relational application systems in a messaging-based communication infrastructure according to the present invention.

FIG. 1 shows an embodiment of the network architecture according to the present invention. As shown therein, applications 106, 116, 120, 126, 130, 136, 140, 146, 150 are coupled to a network 100. Each of the applications 106, 116, 120, 126, 130, 136, 140, 146, 150 may be resident on a single computer system (such as the computer system shown in FIG. 3) or may be resident on a plurality of computer systems coupled to the network 100 or to some other network. These applications may include, for example, relational and non-relational-type applications. In particular, applications 106, 116, 120, 126, 130, 136, 140, 146, 150 may include relational and object-oriented applications. Each application, according to the present invention, is preferably connected to an object broker hub 101 that functions as a central traffic handler for communications between applications 106, 116, 120, 126, 130, 136, 140, 146, 150.

The object broker hub 101 administers a messaging system to preferably allow each application to transfer information to one or more other applications 106, 116, 120, 126, 130, 136, 140, 146, 150 coupled to the network 100. The transferring of information from one application to one or more other applications may be triggered by, for example, business events that cause one application to push information toward the hub 101 for subsequent dissemination over the network 100. Such a business event may include a transaction such as a sales order, for example. In the case of a sales order, one application may need to inform one or more other applications coupled to the network 100 of the existence of the sales order, so that the order may be filled from inventory, for example. Likewise, a shipping application coupled to the network 100 may require the sales order information to coordinate shipping for the item ordered and an accounting application coupled to the network 100 may need to collect information from a number of other applications that process the sales order. According to the present invention, the messaging system administered by the object broker hub 101 preferably follows a publish/subscribe model, wherein each application 106, 116, 120, 126, 130, 136, 140, 146, 150 subscribes to messages of a particular type or types. Messages are then published (e.g., disseminated or broadcast) onto the network 100, and are received only by those applications 106, 116, 120, 126, 130, 136, 140, 146, 150 having subscribed to the type of message that was published. Alternatively, messages of all types may be received by each of the applications 106, 116, 120, 126, 130, 136, 140, 146, 150, each application then processing only those messages matching a particular type or types. This publish/subscribe messaging model according to the present invention allows simple and effective communication between the applications 106, 116, 120, 126, 130, 136, 140, 146, 150, even when none of the applications are aware of any of the existence, communication protocol or address of any of the other applications on the network 100. Therefore, in such a publish/subscribe messaging model, the publishing application preferably does not address messages to any particular other application on the network 100. Rather, the publishing application relies on the object broker hub 101 to forward the published messages toward applications that have subscribed to the type of message published. This avoids the disadvantages inherent in point-to-point integration of applications. Indeed, in point-to-point integration, each application must specifically be made aware of the presence, required communication protocol and address of each other application with which it must communicate and share information. The object broker hub 101 alleviates the applications 106, 116, 120, 126, 130, 136, 140, 146, 150 from having to maintain such information regarding each of the applications coupled to the network 100. This, in turn, allows additional applications to be connected to the network 100 and to communicate with applications 106, 116, 120, 126, 130, 136, 140, 146, 150 with little or no modifications to the applications already residing on the network.

The messaging system according to the present invention may also implement a request-reply messaging model wherein any application 106, 116, 120, 126, 130, 136, 140, 146, 150 may publish a request for information to all of the applications 106, 116, 120, 126, 130, 136, 140, 146, 150 coupled to the network 100 through the object broker hub 101. The application or applications able and ready to provide the requesting application with the requested information then reply to the request by publishing the requested information over the network or by directly posting the reply to the requesting application.

To maintain the loosely-coupled nature of the applications 106, 116, 120, 126, 130, 136, 140, 146, 150 on the network 100, the object broker hub 101 preferably manages a publish-subscribe list of applications 106, 116, 120, 126, 130, 136, 140, 146, 150 and the types of messages each application is configured to receive and process. This keeps each of the applications 106, 116, 120, 126, 130, 136, 140, 146, 150 from having to maintain and update individual publish-subscribe lists. The object broker hub 101 routes the messages toward one or more of the applications 106, 116, 120, 126, 130, 136, 140, 146, 150, based upon list of subscribers of the particular type of message sent.

The messaging system allows applications resident on different hardware and software platforms to communicate and to synergistically interact with one another to accomplish business-related functions. Even in an environment where the majority of the communications are carried out via a publish/subscribe methodology, for disparate applications to make any use of incoming messages, the semantics and syntax of the published messages must be well understood by each application 106, 116, 120, 126, 130, 136, 140, 146, 150 coupled to the network 100. In particular, to allow each of the applications 106, 116, 120, 126, 130, 136, 140, 146, 150 to communicate with one another, a common logical definition of the structure of such messages must be established. For example, many applications coupled to the network 100 may utilize, for example, a customer object that includes a plurality of customer attributes, each attribute being stored in a field within the customer object. Different applications coupled to the network, however, may have a different definition of a customer object. For example, one application may require 5 fields within a customer object, while other applications may require that the customer records be populated with 7 fields, only some of which may be in common or appear in the same order as the customer object definitions of other applications with which the application must communicate. The messaging system, according to the present invention, addresses this issue by maintaining a common logical definition of such objects, records and other data structures that are shared among the applications coupled to the network 100. In one embodiment of the present invention, for example, the customer object is preferably populated with a superset of all fields required by each application coupled to the network 100 that utilizes the customer object. In this manner, any field that is not required by any given application is stripped from the customer object, or simply ignored. Such transformation occurs, according to the present invention, prior to the object reaching its intended application and prior to publishing a message including the object over the network 100. According to the present invention, such transformation may include, for example, changing data types, reordering of fields, omitting of unused fields, combining fields, or the execution of any custom business logic. The messaging-based communication scheme according to the present invention is further carried out by limiting the content of the messages to "business-level" information and functions rather than including lower level procedure or function calls, table accesses or Structured Query Language (hereafter SQL) commands, for example. Such transformations take incoming "business-level" messages and transform them into a format that is compatible with the intended application, in terms of formatting of fields, naming of variables and the like. Such transformations are carried out by the switches 102, 112, 122 and 132 and the high level Application Program Interfaces (hereafter APIs) 104, 114, 118, 124, 128, 134, 138, 144, 148.

Indeed, between the applications 106, 116, 120, 126, 130, 136, 140, 146, 150 and the object broker hub 101 are a plurality of switches, such as switches 102, 112, 122 and 132. Each switch forwards messages received from the object broker hub 101 to an appropriate business object. A business object, according to the present invention, is a broadly inclusive concept that encompasses business information as well as associated business methods and logic for acting upon the business information. For example, a business object may include a sales order, in which the business information may include, for example, the nature and quantity of the items ordered, requested delivery dates and the like, whereas the business methods may include any actions that are necessary to fill the sales order, such as the issuance of orders to inventory, shipping, costing and accounting applications, for example.

For purposes of illustrations, only four switches are shown in FIG. 1. However, it is understood that a lesser or a greater number of switches may be implemented as needed within the network 100. Each switch 102, 112, 122, 132 performs at least a dual function. The first such function is that of interface between the business objects, the messaging system and the object broker hub 101. Indeed, each switch 102, 112, 122, 132 receives a stream of data in the form of messages from the object broker hub 101. The switches 102, 112, 122, 132 then package each message received in a format that is compatible with the appropriate business object for which the message is intended. The switches 102, 112, 122, 132 parse the incoming message data stream and populate the appropriate fields of the data structure of the business object to which the message is intended.

The second function of the switches 102, 112, 122, 132 is to route the messages from the object broker hub 101 to the appropriate business object for the types of messages received. In this manner, messages that are inappropriate for a particular business object are not forwarded to that business object. Each switch 102, 112, 122, 132 preferably maintains rules that match message types to corresponding business objects. When a message is received from the object broker hub 101, the switch 102, 112, 122, 132 formats and forwards the incoming message to an intended business object by consulting its embedded rules, matching messages to corresponding business objects according to message types. Preferably, no business logic is performed in the message handling procedures performed by the switches 102, 112, 122, 132. Indeed, the messaging system should be preferably layered outside of the underlying business logic to be executed.

Figure 2:
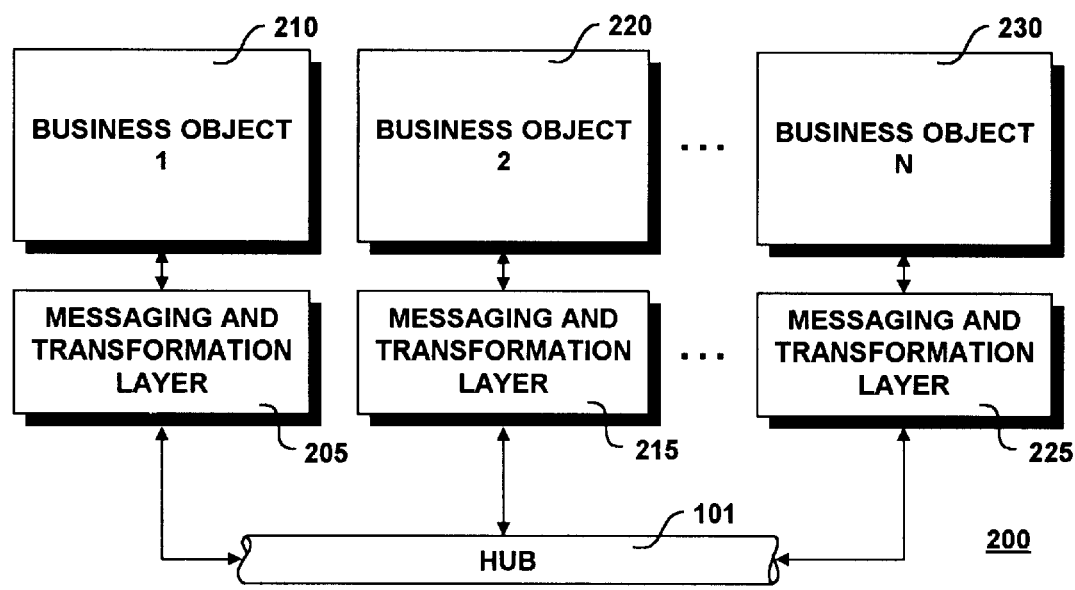
FIG. 2 is a conceptual block diagram of an embodiment of the present invention.

A conceptual block diagram of an embodiment of the present invention is shown in FIG. 2. As shown therein, an object broker hub 101 is coupled to a plurality of messaging and transformation layers 205, 215, 225. The messaging and transformation layers 205, 215, 225 perform the functions of the high level APIs 104, 114, 118, 124, 128, 134, 138, 144, 148, the switches 102, 112, 122, 132 and the messaging system described above. Together, the hub 101 and the messaging and transformation layers 201, 215, 225 transform incoming messages to a format suitable to the message's intended business object and forward the transformed message to one of a plurality of business objects 210, 220, 230 according to the message type. The messaging and transformation layers 205, 215, 225 also receive responses from the business objects 210, 220, 230, format them according to the object's common logical definition and push the transformed responses as messages toward the hub 101. The messaging and transformation layers 205, 215, 225 may implement a publish-subscribe messaging model and/or a request-reply messaging model.

Returning now to FIG. 1, according to the present invention, each business object is represented by a combination of a high level API 104, 114, 118, 124, 128, 134, 138, 144, 148, one or more low level APIs $LLAPI_1$, $LLAPI_2 \ldots LLAPI_n$ and one or more data stores $DS_1$, $DS_2 \ldots DS_n$ within each of the applications 106, 116, 120, 126, 130, 136, 140, 146, 150. The data stores $DS_1$, $DS_2 \ldots DS_n$ are shown in FIG. 1 as being present only in application 106. It is, however, understood similar data stores may be present in each of the applications 116, 120, 126, 130, 136, 140, 146, 150. As shown in FIG. 1, each low level API $LLAPI_1$, $LLAPI_2 \ldots LLAPI_n$ is coupled to each of the data stores $DS_1$, $DS_2 \ldots DS_n$. Each of the data stores $DS_1$, $DS_2 \ldots DS_n$ maps to one or more tables in a database, such as a relational or object-oriented database. In particular, the business methods and logic to be implemented as part of the execution of a business object are preferably mapped to functions and procedures associated with one or more tables in a relational or object-oriented application or system.

As noted above, the switches 102, 112, 122, 132 each include a plurality of rules embedded therein. The rules embedded in the switches 102, 112, 122, 132 are invoked depending upon the type and content of the messages and enable the switches 102, 112, 122, 132 to selectively forward the message or messages to the appropriate business object. Depending, therefore, upon the type and content of the message forwarded to a particular high level API 104, 114, 118, 124, 128, 134, 138, 144, 148 from one of the switches 102, 112, 122, 132, one or more low level APIs $LLAPI_1$, $LLAPI_2 \ldots LLAPI_n$ within an application are called by one or more of the high level APIs 104, 114, 118, 124, 128, 134, 138, 144, 148. The low level APIs $LLAPI_1$, $LLAPI_2 \ldots LLAPI_n$ act on the direction of the high level APIs to perform the specific constituent business functions of the business object by selectively accessing one or more data stores $DS_1$, $DS_2 \ldots DS_n$ to add, delete and modify information stored therein. To the extent possible, existing low level APIs $LLAPI_1$, $LLAPI_2 \ldots LLAPI_n$ are used and invoked by the high level APIs 104, 114, 118, 124, 128, 134, 138, 144, 148. However, in applications which do not possess the necessary native low level APIs to execute the required business objects, additional low level APIs, according to the present invention, may be written and incorporated within the application or applications.

The high level APIs 104, 114, 118, 124, 128, 134, 138, 144, 148 preferably interact with the low level APIs $LLAPI_1$, $LLAPI_2 \ldots LLAPI_n$ in such a manner as to enable the low level APIs $LLAPI_1$, $LLAPI_2 \ldots LLAPI_n$ to report results of the business functions. The high level APIs, in turn, may invoke other low level APIs within the same application based upon the reported results, or may package the result in a message conforming to the logical common definition for the object in question and forward the message to the switches 102, 112, 122, 132 for possible publication over the network 100. It is preferably the responsibility of the high level APIs to insure that outgoing messages (e.g., messages sent toward the switch associated with the high level API) conform to the logical common definition for the object that is the subject of the message. In this manner, no further transformations need be carried out on the message to be published over the network 100 until and if the message reaches another high level API 104, 114, 118, 124, 128, 134, 138, 144, 148, whereupon it will be once again transformed into a format compatible with the application or applications having subscribed to messages of that type.

The high level APIs 104, 114, 118, 124, 128, 134, 138, 144, 148 preferably also have the ability to determine when an application is not responding to a requested execution of a business object. The high level APIs 104, 114, 118, 124, 128, 134, 138, 144, 148, therefore, preferably have the ability to time out and to switch execution of any given business object from one instance of an application on the network 100 to another instance of the same application, all in a manner that is transparent to the user. Similarly, the high level APIs preferably include the ability to determine when a response from one or more low level APIs $LLAPI_1$, $LLAPI_2 \ldots LLAPI_n$ is too old (i.e., unreliable) and to discard the response. That is, if a response from one or more low level APIs $LLAPI_1$, $LLAPI_2 \ldots LLAPI_n$ within an application has not reached the corresponding high level API within a predetermined time period, any response received thereafter is to be discarded. Additionally, the high level APIs 104, 114, 118, 124, 128, 134, 138, 144, 148 may include the ability to store and queue subscribed messages, thereby allowing the application to which it is coupled to respond when it is able to do so. This ability, coupled with the publish/subscribe nature of the messaging system, further strengthens the loosely coupled nature of the connections between applications and allows asynchronous communications between the applications coupled the network 100.

A message formed by one of the high level APIs 104, 114, 118, 124, 128, 134, 138, 144, 148 may be captured by one of the switches 102, 112, 122, 132, and published to the network 100 via the object broker hub 101. Alternatively, the switches 102, 112, 122, 132 may receive an event notification in the form of an incoming message from the object broker hub 101 and perform some business function by appropriately formatting the incoming message and forwarding the formatted message to the appropriate business object for that type of message.

By forming a business object from the incoming message by committing a high level API 104, 114, 118, 124, 128, 134, 138, 144, 148, at least one low level API $LLAPI_1$, $LLAPI_2 \ldots LLAPI_n$ and one or more data stores $DS_1$, $DS_2 \ldots DS_n$, a functionally complete business object may be created, even where the application that executes the business object is not, itself, an object-oriented application, or is an object-oriented application that does not support such a functionally complete business object. This is made possible by the interaction between the low level APIs $LLAPI_1$, $LLAPI_2 \ldots LLAPI_n$ native to the application (and those low level APIs that may have been added to support specific business functions), its corresponding high level API and the structure of the messages. Indeed, the high level APIs 104, 114, 118, 124, 128, 134, 138, 144, 148 coupled to the applications are configured to coordinate the operation of the low level APIs $LLAPI_1$, $LLAPI_2 \ldots LLAPI_n$ according to rules embedded in the high level APIs 104, 114, 118, 124, 128, 134, 138, 144, 148 for that particular type of business object, on the basis of messages having encapsulated business information and business functions and logic. In this manner, even a non-object oriented application appears to behave, from a black box point of view, as if it were an object oriented application.

Additional business functions may be carried out after the high level APIs 104, 114, 118, 124, 128, 134, 138, 144, 148 have received a response from the low level APIs $LLAPI_1$, $LLAPI_2 \ldots LLAPI_n$. For example, a message including a sales order may be received by one of the high level APIs 104, 114, 118, 124, 128, 134, 138, 144, 148 from the messaging system through the object broker hub 101 through one of the switches 102, 112, 122, 132. The high level API 104, 114, 118, 124, 128, 134, 138, 144, 148 may then commit a number of low level APIs $LLAPI_1$, $LLAPI_2 \ldots LLAPI_n$ within one or more applications to carry out the specific accesses to the data stores $DS_1, DS_2 \ldots DS_n$ necessary to process the sales order. After having received an indication from the low level APIs $LLAPI_1$, $LLAPI_2 \ldots LLAPI_n$ that their assigned task is complete, the high level APIs 104, 114, 118, 124, 128, 134, 138, 144, 148 may then commit other low level APIs $LLAPI_1$, $LLAPI_2 \ldots LLAPI_n$ to other tasks such as, for example, reducing inventory by the quantity of items ordered. Alternatively or additionally, the high level API 104, 114, 118, 124, 128, 134, 138, 144, 148 may cause the switch 102, 112, 122, 132 to which it is coupled to format and publish another message for further processing, such as notifying a shipping application coupled to the network 100 of the processed sales order. In this manner, a functionally complete business object is created and may be executed by both object-oriented and non object-oriented applications coupled to the network 100. Such a functionally complete business object, therefore, operates across potentially disparate applications on a network to accomplish and automate real-world business tasks, eliminate duplicative data entry errors, save time and reduce opportunities for human error. This is accomplished with little or no modification to the applications themselves, apart from developing appropriate low level APIs if such are not already native to the applications, and developing a high level API for each application.

Transactional integrity, according to the present invention, may be insured through a multi-phase commit scheme, with roll-backs upon unsuccessful completion of any phase or a time out. Indeed, completion of the task assigned to the low level APIs $LLAPI_1, LLAPI_2 \ldots LLAPI_n$ may be monitored by the high level APIs 104, 114, 118, 124, 128, 134, 138, 144, 148. Upon successful completion of their assigned task, the low level APIs $LLAPI_1$, $LLAPI_2 \ldots LLAPI_n$ may be released by their associated high level APIs 104, 114, 118, 124, 128, 134, 138, 144, 148. However, upon unsuccessful completion or upon the expiration of a predetermined time period, the low level APIs are preferably not released by their corresponding high level APIs 104, 114, 118, 124, 128, 134, 138, 144, 148 until successful completion is reported. Alternatively, the high level APIs 104, 114, 118, 124, 128, 134, 138, 144, 148 may switch execution of the business object at hand to another instance of the same application on the network 100, thereby insuring successful execution of the business object without being wholly dependant upon any single instance of any application 106, 116, 120, 126, 130, 136, 140, 146, 150. Alternatively still, for example, the high level APIs 104, 114, 118, 124, 128, 134, 138, 144, 148 may report a failure upon expiration of a predetermined time out period.

As alluded to above, to couple additional applications to the network 100, it is preferable, according to the present invention, to utilize the existing low level APIs native to the new application to be coupled to the network 100. If all necessary low level APIs already exist within the new application to be coupled to the network 100, then those existing low level APIs may be coupled to a high level API, such as referenced by numerals 104, 114, 118, 124, 128, 134, 138, 144, 148 in FIG. 1. If, however, the new application to be coupled to the network 100 does not possess all necessary low level APIs to perform the requisite business functions that are to be assigned to that application, then one or more new low level APIs may be written and interfaced with a high level API. The high level API for the new application to be coupled to the network 100 is preferably itself coupled to a switch, such as the switches referenced in FIG. 1 by numerals 102, 112, 122, 132. Preferably, little or no modifications are made to other applications on the network.

By combining the advantages of a message-based communication scheme in which the messages conform to a logical common definition, intelligent switches having embedded rules for interfacing with the messaging system and for switching messages to the correct business object and high level APIs communicating with low level APIs native to each application, a loosely coupled network of disparate applications is obtained. This loose coupling allows additional applications, whether object or non-object oriented, to be added to the network with ease and without unnecessary modifications to applications already residing on the network. Moreover, the aforementioned combination also provides the infrastructure necessary for the execution of functionally complete business objects, even when running applications that do not support business objects, such as relational applications.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A method of loosely coupling object and non-object oriented applications in a network, comprising the steps of:
    formatting an incoming message destined for at least one of the object and non-object oriented applications according to a logical definition scheme common to all applications on the network;
    implementing a publish/subscribe messaging model that maintains a subscription list for each application on the network, the subscription list maintained by each application indicating at least one type of published message the application has subscribed to receive;
    consulting the subscription list associated with each application and publishing the incoming message toward at least one selected application coupled to the network that has subscribed to the type of the incoming message having been published; and
    routing, for each selected application, the incoming message to a selected business object according to predetermined rules associated with a type of the incoming message, the business object including a high level application program interface (API), business logic and at least one low level API, the high level API performing a business function of the business object by invoking at least one selected low level API within the selected application.

2. The method of claim 1, further comprising the step of reporting back a result of the business function to the high level API, via said at least one low level API.

3. The method of claim 2, wherein the high level API further carries out the step of insuring transactional integrity by timing out when a predetermined time period elapses without receiving the result from said at least one selected low level API.

4. The method of claim 1, further comprising the step of implementing an object broker-based messaging infrastructure by routing all messages between applications through an object broker.

5. The method of claim 4, wherein an operation of the object broker is based on the Common Object Request Broker (CORBA) standard.

6. The method of claim 1, wherein said at least one low level API interacts with data storage in the selected application to carry out at least a portion of the business function of the business object.

7. The method of claim 1, wherein the high level API further carries out the step of formatting messages to be published to the network.

8. The method of claim 1, further comprising the step of embedding business information within each message, the embedded business information controlling said at least one selected application toward which the incoming message is routed in the routing step.

9. A method of interfacing at least one non-object oriented application with at least one object-oriented application in a network implementing a messaging-based communication system, comprising the steps of:

implementing a publish/subscribe messaging model that maintains a subscription list for each of the object oriented and non-object oriented applications on the network, the subscription list maintained by each application indicating at least one type of published message the application has subscribed to receive;

consulting the subscription list associated with each application and publishing the incoming message toward at least one selected application coupled to the network that has subscribed to the type of the incoming message having been published;

providing at least one high level Application Program Interface (API) external to the at least one non-object oriented application, the high level API being configured to format messages to a format appropriate to the at least one non-object oriented application, each message handled by the communication system conforming to a logical definition scheme common to all applications on the network; and controlling at least one low level API native to the non-object oriented application by said at least one high level API to cause said at least one low level API to access at least one data store within said non-object oriented application to carry out logic embedded within the messages, said at least one high level API, said at least one low level API and said at least one data store thereby representing a functionally complete object.

10. The method of claim 9, further comprising the step of:

providing switch means between the network and said at least one high level API, said switch means providing an interface between the messaging-based communication system and said at least one high level API, and routing incoming messages to the functionally complete business object.

* * * * *